United States Patent
Diamand et al.

(10) Patent No.: US 10,915,453 B2
(45) Date of Patent: Feb. 9, 2021

(54) MULTI LEVEL SYSTEM MEMORY HAVING DIFFERENT CACHING STRUCTURES AND MEMORY CONTROLLER THAT SUPPORTS CONCURRENT LOOK-UP INTO THE DIFFERENT CACHING STRUCTURES

(71) Applicant: INTEL CORPORATION, Santa Clara, CA (US)

(72) Inventors: Israel Diamand, Aderet (IL); Zvika Greenfield, Kfar Sava (IL); Julius Mandelblat, Haifa (IL); Asaf Rubinstein, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 15/394,550

(22) Filed: Dec. 29, 2016

(65) Prior Publication Data
US 2018/0189192 A1    Jul. 5, 2018

(51) Int. Cl.
*G06F 12/0893* (2016.01)
*G06F 12/0884* (2016.01)
*G06F 12/0864* (2016.01)
*G06F 12/0897* (2016.01)
*G06F 12/128* (2016.01)

(52) U.S. Cl.
CPC ...... *G06F 12/0893* (2013.01); *G06F 12/0864* (2013.01); *G06F 12/0884* (2013.01); *G06F 12/0897* (2013.01); *G06F 12/128* (2013.01); *G06F 2212/1024* (2013.01); *G06F 2212/507* (2013.01); *G06F 2212/608* (2013.01)

(58) Field of Classification Search
None
See application file for complete search history.

(56) References Cited

U.S. PATENT DOCUMENTS

| | | | | |
|---|---|---|---|---|
| 5,261,066 A | * | 11/1993 | Jouppi | G06F 12/0862 711/122 |
| 5,900,012 A | * | 5/1999 | Tran | G06F 12/0844 711/120 |
| 5,912,839 A | | 6/1999 | Ovshinsky et al. | |
| 6,035,432 A | | 3/2000 | Jeddeloh | |
| 6,243,791 B1 | | 6/2001 | Vondran | |

(Continued)

FOREIGN PATENT DOCUMENTS

| | | |
|---|---|---|
| CN | 1100540 A | 3/1995 |
| CN | 101079003 A | 11/2007 |

(Continued)

OTHER PUBLICATIONS

International Search Report and Written Opinion for PCT Patent Application No. PCT/US2017/061385, dated Feb. 8, 2018, 14 pages.

(Continued)

*Primary Examiner* — Pierre Miche Bataille
*Assistant Examiner* — Ryan Dare
(74) *Attorney, Agent, or Firm* — Compass IP Law PC (57) ABSTRACT

An apparatus is described. The apparatus includes a memory controller to interface to a multi-level system memory having first and second different cache structures. The memory controller has circuitry to service a read request by concurrently performing a look-up into the first and second different cache structures for a cache line that is targeted by the read request.

18 Claims, 5 Drawing Sheets

(56) References Cited

U.S. PATENT DOCUMENTS

| | | |
|---|---|---|
| 6,292,874 B1 | 9/2001 | Barnett |
| 6,766,419 B1 | 7/2004 | Zahir et al. |
| 7,590,918 B2 | 9/2009 | Parkinson |
| 7,600,078 B1 | 10/2009 | Cen et al. |
| 7,756,053 B2 | 7/2010 | Thomas et al. |
| 7,913,147 B2 | 3/2011 | Swaminathan et al. |
| 8,051,253 B2 | 11/2011 | Okin et al. |
| 8,462,537 B2 | 6/2013 | Karpov et al. |
| 8,462,577 B2 | 6/2013 | Zeng et al. |
| 8,463,948 B1 | 6/2013 | Qawami et al. |
| 8,605,531 B2 | 12/2013 | Kau |
| 8,607,089 B2 | 12/2013 | Qawami et al. |
| 8,612,676 B2 | 12/2013 | Dahlen et al. |
| 8,612,809 B2 | 12/2013 | Casper et al. |
| 8,626,997 B2 | 1/2014 | Qawami et al. |
| 8,649,212 B2 | 2/2014 | Kau et al. |
| 8,838,935 B2 | 9/2014 | Hinton et al. |
| 9,087,584 B2 | 7/2015 | Dahlen et al. |
| 9,342,453 B2 | 5/2016 | Nale et al. |
| 9,378,133 B2 | 6/2016 | Nachimuthu et al. |
| 9,378,142 B2 | 6/2016 | Ramanujan et al. |
| 9,430,372 B2 | 8/2016 | Nachimuthu et al. |
| 9,529,708 B2 | 12/2016 | Puthiyedath et al. |
| 9,582,430 B2 | 2/2017 | Greenfield et al. |
| 9,600,407 B2 | 3/2017 | Faber |
| 9,600,416 B2 | 3/2017 | Ramanujan et al. |
| 9,619,408 B2 | 4/2017 | Nale et al. |
| 9,690,493 B2 | 6/2017 | Dahlen et al. |
| 9,710,054 B2 | 7/2017 | Diamand et al. |
| 2002/0116581 A1* | 8/2002 | Donoghue .......... G06F 12/0835 711/128 |
| 2004/0103250 A1 | 5/2004 | Alsup |
| 2005/0273584 A1 | 12/2005 | Wisecup et al. |
| 2006/0020756 A1 | 1/2006 | Tran et al. |
| 2007/0005922 A1 | 1/2007 | Swaminathan et al. |
| 2007/0101067 A1 | 5/2007 | Shafi et al. |
| 2007/0255891 A1 | 11/2007 | Chow et al. |
| 2008/0016269 A1 | 1/2008 | Chow et al. |
| 2008/0034148 A1 | 2/2008 | Gower et al. |
| 2008/0046657 A1 | 2/2008 | Eichenberger et al. |
| 2008/0082766 A1 | 4/2008 | Okin et al. |
| 2008/0235443 A1 | 9/2008 | Chow et al. |
| 2008/0270811 A1 | 10/2008 | Chow et al. |
| 2009/0119498 A1 | 5/2009 | Narayanan |
| 2009/0313416 A1 | 12/2009 | Nation |
| 2010/0110748 A1 | 5/2010 | Best |
| 2010/0131827 A1 | 5/2010 | Sokolov et al. |
| 2010/0291867 A1 | 11/2010 | Abdulla et al. |
| 2010/0293317 A1 | 11/2010 | Confalonieri et al. |
| 2010/0306446 A1 | 12/2010 | Villa et al. |
| 2010/0306453 A1 | 12/2010 | Doller |
| 2010/0318718 A1 | 12/2010 | Eilert et al. |
| 2011/0047365 A1 | 2/2011 | Hentosh et al. |
| 2011/0060869 A1 | 3/2011 | Schuette |
| 2011/0153916 A1 | 6/2011 | Chinnaswamy et al. |
| 2011/0208900 A1 | 8/2011 | Schuette et al. |
| 2011/0291884 A1 | 12/2011 | Oh et al. |
| 2013/0138894 A1* | 5/2013 | Loh .................. G06F 12/0888 711/144 |
| 2013/0268741 A1 | 10/2013 | Daly et al. |
| 2013/0275661 A1 | 10/2013 | Zimmer et al. |
| 2013/0282967 A1 | 10/2013 | Ramanujan |
| 2014/0129767 A1* | 5/2014 | Ramanujan ......... G06F 12/0897 711/105 |
| 2015/0127907 A1* | 5/2015 | Fahim ................ G06F 12/0831 711/120 |
| 2015/0309937 A1* | 10/2015 | Yuan .................. G06F 12/0893 711/108 |
| 2015/0363314 A1 | 12/2015 | Chung |
| 2016/0283389 A1 | 9/2016 | Diamand et al. |
| 2016/0283392 A1 | 9/2016 | Greenfield et al. |
| 2016/0350237 A1 | 12/2016 | Anantaraman et al. |
| 2017/0031821 A1 | 2/2017 | Ramanujan et al. |
| 2017/0091099 A1 | 3/2017 | Greenfield et al. |
| 2017/0139649 A1 | 5/2017 | Puthiyedath et al. |
| 2017/0249250 A1 | 8/2017 | Ramanujan et al. |
| 2017/0249266 A1 | 8/2017 | Nale et al. |
| 2017/0285703 A1 | 10/2017 | Diamand et al. |
| 2018/0011790 A1 | 1/2018 | Gaur et al. |
| 2018/0089096 A1 | 3/2018 | Greenspan et al. |
| 2018/0095893 A1* | 4/2018 | Dooley .................. G06F 9/383 |
| 2019/0188596 A1* | 6/2019 | Ipek ........................ G06F 7/381 |

FOREIGN PATENT DOCUMENTS

| | | |
|---|---|---|
| CN | 101620539 B | 12/2013 |
| WO | 2005002060 A2 | 1/2005 |
| WO | WO2008149348 A2 * | 12/2008 |

OTHER PUBLICATIONS

"Phase change memory-based 'moneta' system points to the future of computer storage", ScienceBlog, Jun. 2, 2011, 7 pgs.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Akel et al., "Onyx: A Prototype Phase Change Memory Storage Array," https://www.flashmemorysummit.com/English/Collaterals/Proceedings/2011/Pr-oceedings.sub.--Chrono.sub.--2011.html, Flash Memory Summit 2011 Proceedings, Aug. 11, 2011.

Bailey et al., "Operating System Implications of Fast, Cheap, Non-Volatile Memory" 13th USENIX, HOTOS11 2011, May 9-11, 2011, 5 pages.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

Chen et al, "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al., "Better I/0 Through Byte-Addressable, Persistent Memory", SOSP '09, Oct. 11, 2009, pp. 133-146. Big Sky, Montana, USA.

Dhiman, et al. "PDRAM: A Hybrid PRAM and DRAM Main Memory System", Jul. 26, 2009, Department of Computer Science and Engineering, 6 pages.

Freitas et al., "Storage-class memory: The next storage system technology", IBM J. Res. & Dev., Jul./Sep. 2008, pp. 439-447, vol. 52, No. 4/5.

Jacob, "The Memory System You Can't Avoid It, You Can't Ignore It, You Can't Fake It," Morgan & Claypool, Synthesis Lectures on Computer Architecture, vol. 4, No. 1, pp. 1-77, Jun. 2009.

Kant, Dr. Krishna, "Exploiting NVRAM for Building Multi-Level Memory Systems", InternationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09 Proceedings of the 36th Annual International Symposium on Computer Architecture, pp. 2-13, Jun. 20-24, 2009.

Mearian, "IBM announces computer memory breakthrough Phase-change memory offers 100 times the write performance of NANO flash", Jun. 30, 2011, 3 pgs.

Mogul et al., "Operating System Support for NVM+DRAM Hybrid Main Memory", 12th Workshop on Hot Topics in Operating Systems {HatOS XII), May 18, 2009, 9 pgs.

Quereshi et al., "Scalable High Performance Main Memory System Using Phase-Change Memory Technology", ISCA '09, Jun. 20, 2009, 10 pgs., Austin, Texas, USA.

Raoux et al., "Phase-Change Random Access Memory: A Scalable Technology," IBM Journal of Research and Development, vol. 52, Issue 4, pp. 465-479, Jul. 2008.

(56) References Cited

OTHER PUBLICATIONS

Wu et al., "eNVy: A Non-Volatile, Main Memory Storage System," ASPLOS VI Proceedings of the Sixth International Conference on Architectural Support for Programming Languages and Operating Systems, 12 pages, Oct. 1994.
Extended European Search Report for Patent Application No. 17887952.4, dated Jul. 31, 2020, 9 pages.

* cited by examiner

MULTI LEVEL SYSTEM MEMORY HAVING DIFFERENT CACHING STRUCTURES AND MEMORY CONTROLLER THAT SUPPORTS CONCURRENT LOOK-UP INTO THE DIFFERENT CACHING STRUCTURES

FIELD OF INVENTION

The field of invention pertains generally to the computing sciences; and, more specifically, to a multi level system memory having different caching structures and memory controller that supports concurrent look-up into the different caching structures.

BACKGROUND

Computing system designers are increasingly interested in improving the efficiency of their designed systems. System memory, also referred to as main memory, is increasingly becoming an area where efficiency improvements can be made.

FIGURES

A better understanding of the present invention can be obtained from the following detailed description in conjunction with the following drawings, in which.

DETAILED DESCRIPTION 1.0 Multi-Level System Memory

Figure 1:
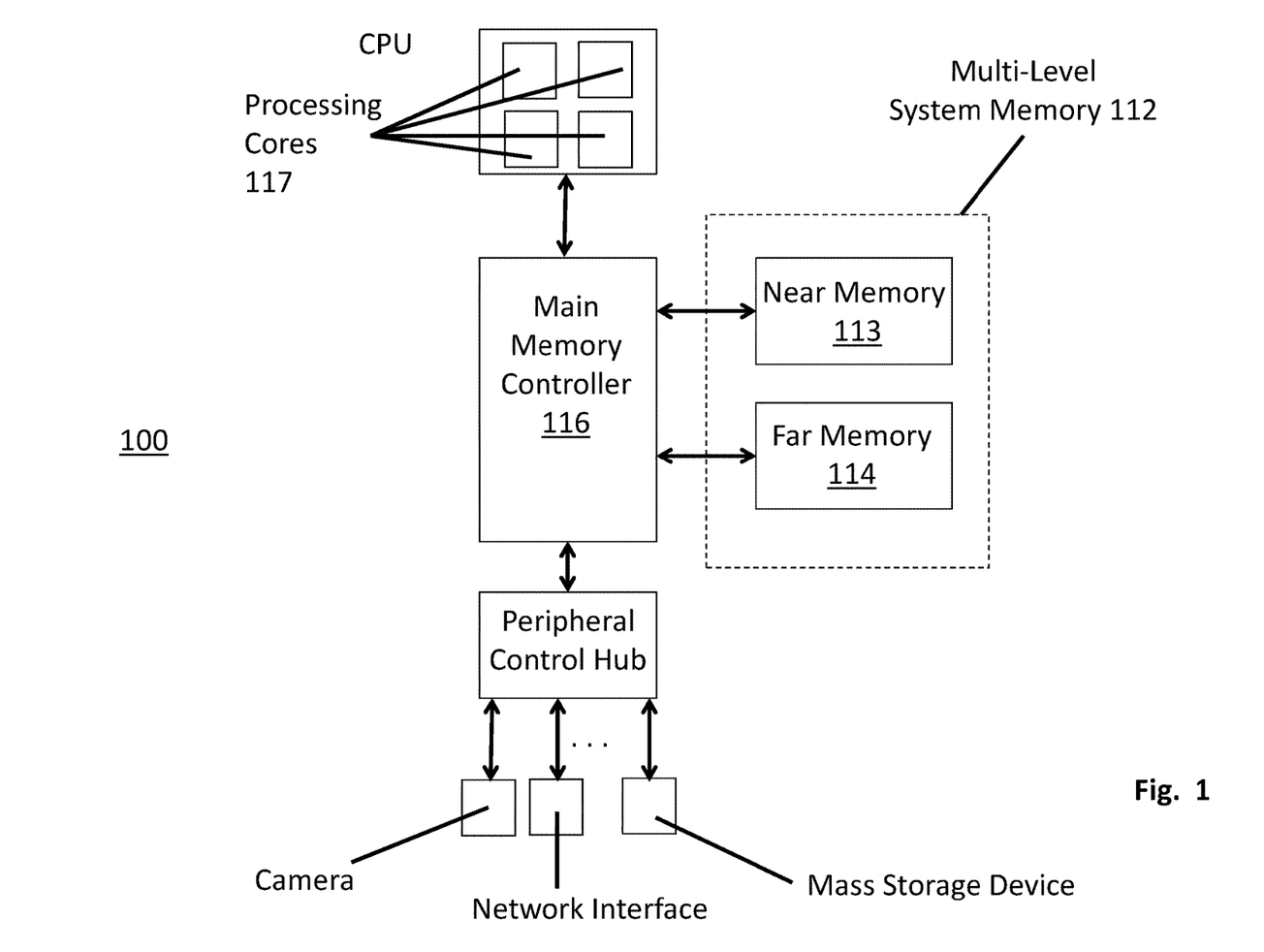
FIG. 1 shows a computing system having a multi-level system memory.

One of the ways to improve system memory performance is to have a multi-level system memory. FIG. 1 shows an embodiment of a computing system 100 having a multi-tiered or multi-level system memory 112. According to various embodiments, a smaller, faster near memory 113 may be utilized as a cache for a larger far memory 114.

The use of cache memories for computing systems is well-known. In the case where near memory 113 is used as a cache, near memory 113 is used to store an additional copy of those data items in far memory 114 that are expected to be more frequently called upon by the computing system. The near memory cache 113 has lower access times than the lower tiered far memory 114 region. By storing the more frequently called upon items in near memory 113, the multi-level system memory 112 will be observed as faster because a computing system will often read items that are being stored in faster near memory 113. For an implementation using a write-back technique, the copy of data items in near memory 113 may contain data that has been updated by the central processing unit (CPU), and is thus more up-to-date than the data in far memory 114. The process of writing back 'dirty' cache entries to far memory 114 ensures that such changes are not lost.

According to some embodiments, for example, the near memory 113 exhibits reduced access times by having a faster clock speed than the far memory 114. Here, the near memory 113 may be a faster (e.g., lower access time), volatile system memory technology (e.g., high performance dynamic random access memory (DRAM)) and/or static random access memory (SRAM) memory cells co-located with the memory controller 116. By contrast, far memory 114 may be either a volatile memory technology implemented with a slower clock speed (e.g., a DRAM component that receives a slower clock) or, e.g., a non volatile memory technology that may be slower (e.g., longer access time) than volatile/DRAM memory or whatever technology is used for near memory.

For example, far memory 114 may be comprised of an emerging non volatile random access memory technology such as, to name a few possibilities, a phase change based memory, three dimensional crosspoint memory device, or other byte addressable nonvolatile memory devices, "write-in-place" non volatile main memory devices, memory devices that use chalcogenide, single or multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.

Such emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging byte addressable non volatile memory technologies to be used in a main system memory role rather than a traditional mass storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than larger based accesses associated with traditional, non volatile mass storage (e.g., solid state drive (SSD), hard disk drive (HDD)), and/or, otherwise acts as an (e.g., byte) addressable memory that the program code being executed by processor(s) of the CPU operate out of. However, far memory 114 may be inefficient when accessed for a small number of consecutive bytes (e.g., less than 128 bytes) of data, the effect of which may be mitigated by the presence of near memory 113 operating as cache which is able to efficiently handle such requests.

Because near memory 113 acts as a cache, near memory 113 may not have formal addressing space. Rather, in some cases, far memory 114 defines the individually addressable memory space of the computing system's main memory. In various embodiments near memory 113 acts as a cache for far memory 114 rather than acting as a last level CPU cache. Generally, a CPU cache is optimized for servicing CPU transactions, and will add significant penalties (such as cache snoop overhead and cache eviction flows in the case of hit) to other memory users such as Direct Memory Access (DMA)-capable devices in a Peripheral Control Hub (PCH). By contrast, a memory side cache is designed to handle accesses directed to system memory, irrespective of whether they arrive from the CPU, from the Peripheral Control Hub, or from some other device such as display controller.

In various embodiments, the memory controller 116 and/or near memory 113 may include local cache information (hereafter referred to as "Metadata") so that the memory controller 116 can determine whether a cache hit or cache miss has occurred in near memory 113 for any incoming memory request. The metadata may also be stored in near memory 113.

In the case of an incoming write request, if there is a cache hit, the memory controller 116 writes the data (e.g., a 64-byte CPU cache line) associated with the request directly over the cached version in near memory 113. Likewise, in the case of a cache miss, in an embodiment, the memory controller 116 also writes the data associated with the request into near memory 113, potentially first having fetched from far memory 114 any missing parts of the data required to make up the minimum size of data that can be marked in Metadata as being valid in near memory 113, in a technique known as 'underfill'. However, if the entry/entries in the near memory cache 113 that the content can be written into has been allocated to a different system memory address/addresses and contains newer data than held in far memory 114 (i.e., it is dirty), the data occupying the entry is evicted from near memory 113 and written into far memory 114.

In the case of an incoming read request, if there is a cache hit, the memory controller 116 responds to the request by reading the version of the cache line from near memory 113 and providing it to the requestor. By contrast, if there is a cache miss in near memory 113, the memory controller 116 reads the requested cache line from far memory 114 and, in some embodiments, not only provides the cache line to the requestor but also writes another copy of the cache line into near memory 113. In many cases, the amount of data requested from far memory 114 and the amount of data written to near memory 113 will be larger than that requested by the incoming read request. Using a larger data size from far memory or to near memory increases the probability of a cache hit for a subsequent transaction to a nearby memory location.

In general, cache lines may be written to and/or read from near memory and/or far memory at different levels of granularity (e.g., writes and/or reads only occur at cache line granularity (and, e.g., byte addressability for writes/or reads is handled internally within the memory controller), byte granularity (e.g., true byte addressability in which the memory controller writes and/or reads only an identified one or more bytes within a cache line), or granularities in between.) Additionally, note that the size of the cache line maintained within near memory and/or far memory may be larger than the cache line size maintained by CPU level caches. Different types of near memory caching architecture are possible (e.g., direct mapped, set associative, etc.).

The physical implementation of near memory and far memory in any particular system may vary from embodiment. For example, DRAM near memory devices may be coupled to a first memory channel whereas emerging non volatile memory devices may be coupled to another memory channel. In yet other embodiments the near memory and far memory devices may communicate to the host side memory controller through a same memory channel (in an even further embodiment, near memory and far memory devices are disposed on a same DIMM card). The near memory and/or far memory devices may be integrated in a same semiconductor chip package(s) as the processing cores and memory controller, or, may be integrated outside the semiconductor chip package(s).

The far memory devices may be coupled directly to a far memory controller, where, a separate communication channel couples the far memory controller to the main host side memory controller (e.g., a multi-drop memory channel bus, a point to point link, etc). The far memory controller performs various tasks that are, e.g., specific to emerging non volatile memory devices that are used for far memory. For example, the far memory controller may apply signals to the far memory devices having special voltages and/or timing requirements, may manage the movement/rotation of more frequently accessed data to less frequently accessed storage cells (transparently to the system's system memory addressing organization from the perspective of the processing cores under a process known as wear leveling) and/or may identify groups of bad storage cells and prevent their future usage (also known as bad block management).

The host side memory controller may be able to communicate to multiple far memory controllers and corresponding far memory devices as memory expansion "plug-ins". In various embodiments, the memory expansion plug-in solutions may be implemented with point-to-point links (e.g., one PCIe link per plug-in). Non expanded far memory (provided as part of the basic original system) may or may not be implemented with point-to-point links (e.g., dual in line memory module (DIMM) cards having near memory devices, far memory devices or a combination of near and far memory devices may be plugged into a double data rate (DDR) memory channel that emanates from the main memory controller).

2.0 Multi-Level System Memory Having Associative and Direct Mapped Caches

Figure 2:
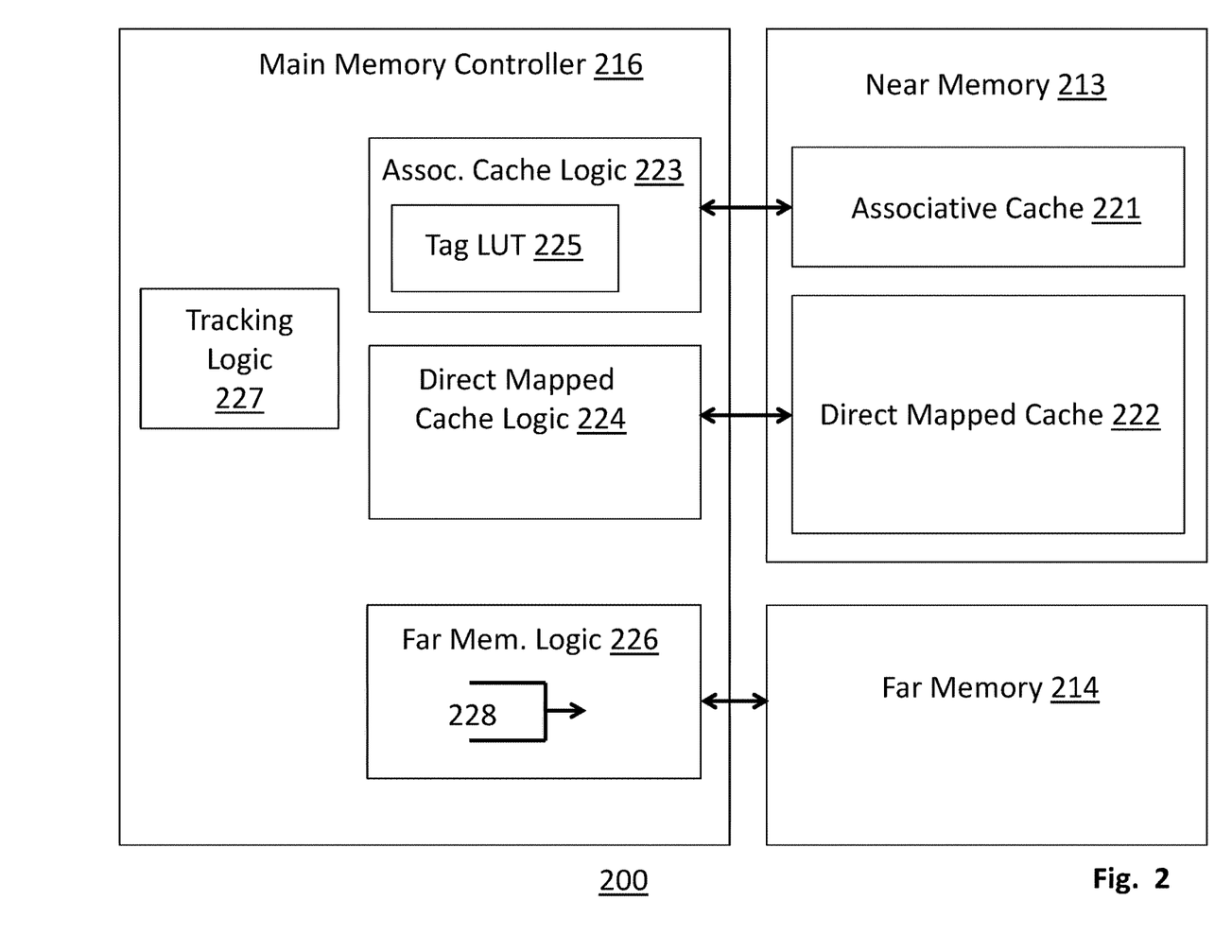
FIG. 2 shows a multi-level system memory having associative and direct mapped caching structures.

FIG. 2 shows a particular multi-level system memory implementation 200 in which near memory 213 is used to support two different caching schemes. A first of the caching schemes is a faster tag look-up cache and is implemented as an associative cache 221. A second of the caching schemes is a slower tag look-up cache and is implemented as a direct mapped cache 222.

Here, as is understood in the art, an associative cache is able to map any particular system memory address into a plurality of the cache's different storage slots (in the case of an associative cache, the plurality of slots for any specific address are referred to as the "ways" for that address). As such, a particular cache line may be stored in any of the slots that its system memory address maps to (in various embodiments, the slots are identified by performing a hashing function on the system memory address). By contrast, in the case of a direct mapped cache, a particular system memory address maps to only one slot in the cache.

An associative cache therefore is more efficient in terms of being able to keep the most commonly accessed cache lines. That is, in the case of an associative cache, if a highly utilized cache line maps to a slot that is already consumed by another highly utilized cache line, it may be able to be stored in one of the other slots in the associative cache that the cache line's address maps to (which also may be keeping, e.g., a lesser used cache line). By contrast, in the case of a direct mapped cache, if the slot that a highly utilized cache line maps to is already keeping another highly utilized cache line, one of the highly used cache lines will not be able to be kept in the cache.

However, the improved caching efficiency of the associative cache is achieved at the expense of significantly more complicated memory controller circuitry 223 needed to implement the associative cache. As observed in FIG. 2, such circuitry 223 includes a tag look up table 225. The tag lookup table 225 includes an entry for each slot in the associative cache 221. Each entry in the look up table 225 holds the tag of the particular cache line that is currently being held in the entry's corresponding slot in the associative cache 221. A tag is a unique identifier of a particular cache line.

In response to the reception of a read or write request, the associative cache logic 223 will perform a look up into the entries of the table 225 that correspond to the slots in the associative cache 221 that the address of the cache line that is the subject of the read or write request maps to. If there is a "hit" (one of the tags in the table 225 matches the tag of the request's address), in the case of read, the cache line is read from the matching slot in the associative cache 221. In the case of a write, the cache line that is appended to the write request is written into the matching slot.

In there is a "miss", in the case of a read, the read request is serviced elsewhere (the requested cache line is not in the associative cache 221). In the case of a write that misses, the associative cache logic 223 may choose to evict a cache line that is currently resident in one of the slots that the write request's address maps to (e.g., according to a least recently used (LRU) algorithm) so that the cache line that is appended to the write request can be written into the associative cache (if so, the written cache line's tag will be entered into the corresponding entry in the table 225).

Because the table 225 includes an entry for each slot in the associative cache 221 it can become increasingly large and expensive (from a silicon chip surface area consumption perspective) with increasing associative cache 221 size. As such, in the implementation of the memory subsystem of FIG. 2, the associative cache is made to be smaller than the direct mapped cache 222 (e.g., 3×, 5×, 10×, 15× smaller). By keeping the associative cache 221 small, the cost of the look up table 225 and its supporting circuitry is kept minimal.

The logic circuitry 224 used to implement the direct mapped cache 222, by contrast, need not include a look-up table. Rather, the tag of a particular cache line that is kept in a direct mapped cache slot may be kept in the slot along with the cache line. That is, unlike the associative cache 222 which keeps tags in the memory controller 216, by contrast, the direct mapped cache can keep tags in the cache 222 itself (the data width for the direct mapped cache therefore should be wide enough to keep not only the cache line but also the additional meta data including the tag).

In the case of a read or write request to the direct mapped cache 222, the slot that the request's address maps to is read from the direct mapped cache 222 and the tag that was included with the read from the slot is compared against the tag of the request's address. If the tags match there is a cache hit. In the case of a read the cache line that was read from the slot is provided as the response to the read request. In the case of a write the cache line that was included in the request is written into the slot. If the tags do not match there is a cache miss and the request is serviced elsewhere.

The memory controller 216 also includes tracking logic 227 to manage the eviction/filling of cache lines from/to the associative cache 221, the direct mapped cache 222 and the far memory 214. Here, in various embodiments, when a cache line is evicted from the associative cache 221 it is inserted into the direct mapped cache 222 (in alternate embodiments, a cache line that is evicted from the associative cache is sent to far memory 214). Additionally, when a cache line is evicted from the direct mapped cache 222 it is written into far memory 214.

In the case of a system memory read request that is received by the main memory controller 216, the associative cache 221 is looked into first. if there is a hit in the associative cache 216 the cache line in the associative cache is provided as the response to the request. If there is a miss in the associative cache 221, the direct mapped cache 222 is looked into. If the looked for cache line is in the direct mapped cache 222, the cache line that was read from the direct mapped cache 222 is provided as the response to the read request.

Additionally, in various approaches, the cache line that is provided as the response to a read request is forwarded to the associative cache logic 223 for keeping in the associative cache 221. The writing of the cache line into the associative cache 221 may cause the eviction of another cache line from the associative cache 221. The cache line that is evicted from the associative cache 221 may then be forwarded to the direct mapped cache logic 224 for insertion into the direct mapped cache 222. The insertion of the cache line into the direct mapped cache 222 may cause the eviction of another cache line from the direct mapped cache 222 which is forwarded to far memory logic 226 for writing into far memory 214. In still yet other embodiments a read response that is provided from a hit in the direct mapped cache 222 is not forwarded to the associative cache 221. Rather, the cache line remains in the direct mapped cache without change to the associative cache. In still yet other embodiments a dynamic decision is made as to which of the caches 221, 222 the cache line from far memory is to be entered into. That is, a cache line provided from far memory to service a read request may be entered into either the associative cache 221 or the direct mapped cache 222 depending on the outcome of a cache selection algorithm.

If there is a miss in the direct mapped cache 222, the read request is forwarded to the far memory logic 226. The requested cache line is fetched from far memory 214 and provided as the response to the request. Additionally, the cache line that is provided from far memory 214 may be forwarded to the associative cache logic 223 for keeping in the associative cache 221 (which, again, may cause the eviction of a first cache line from the associative cache 221 which will be inserted into the direct mapped cache 222 which in turn causes the eviction of a second cache line from the direct mapped cache 222 which will be inserted into far memory 214). Alternatively (or even in combination), the cache line that is provided from far memory 214 is entered into the direct mapped cache 222 rather than the associative cache 221 (which can cause eviction of another cache line from the direct mapped cache).

In the case of a system memory write request, the associative cache 221 is looked into first. if there is a hit in the associative cache 221, the cache line that is appended to the request is written into the same slot where the corresponding cache line already resides in the associative cache 221. If there is a miss in the associative cache, the cache line is written into the associative cache 221 which may cause the eviction of another cache line to the direct mapped cache 222. If so, a lookup is performed by the direct mapped cache logic 224 for the cache line that has just been evicted from the associative cache 221. If the lookup results in a direct mapped cache hit the evicted cache line is written over the corresponding cache line content in the direct mapped cache 222. If the lookup into the direct mapped cache is a miss, the evicted cache line is written into the direct mapped cache 222 which causes the eviction of another cache line from the direct mapped cache 222 which is subsequently written into far memory 214.

Here, tracking logic 227 "keeps track" of the movement of the various cache lines between the caches 221, 222 and far memory 214. Specifically, the tracking logic 227 maintains an understanding of which cache lines are being inserted into the caches 221, 222 and maintains an understanding of which cache lines are being evicted from the caches 221, 222. The tracking logic 227 therefore can identity which cache lines are in a transient state to or from either of the caches 221, 222. The tracking logic 227 in various embodiments can track cache lines that are waiting to be written into far memory (e.g, are queued in far memory write queue 228).

Recall that, because the direct mapped cache 222 does not have the expense of a memory controller side look-up table 225, the direct mapped cache 222 is made to be larger than the associative cache 221. However, because the associative cache 221 can perform tag look-ups on die with table 225, the associative cache 221 can be viewed as a faster tag look-up cache than the direct mapped cache 222. Thus, as described just above, a read request is first handled by looking into the associative cache 221. If the look into the associative cache 221 results in a miss, then, the direct mapped cache 222 is looked into. If the look into direct mapped cache 222 results in a miss than the far memory 214 is looked into. (For read and write requests the state of the tracking logic 227 is also checked to see if the looked for cache line is in a transient state. The response processes take appropriate action if so).

The first look into the associative cache 221, however, is wasteful for those requests that result in a direct mapped cache hit or are serviced from far memory 214. That is, the initial look into the associative cache 221 adds to the latency of memory requests that are not serviced from the associative cache 221. Additionally, because the direct mapped cache 222 is larger than the associative cache 216, the probability of a hit in the direct mapped cache 222 is not inconsequential. Thus, the delay of looking into the associative cache 214 for what may be a significant number of read requests that are actually serviced from the direct mapped cache 222 reduces the observed performance of the near memory 213 caching system.

Figure 3:
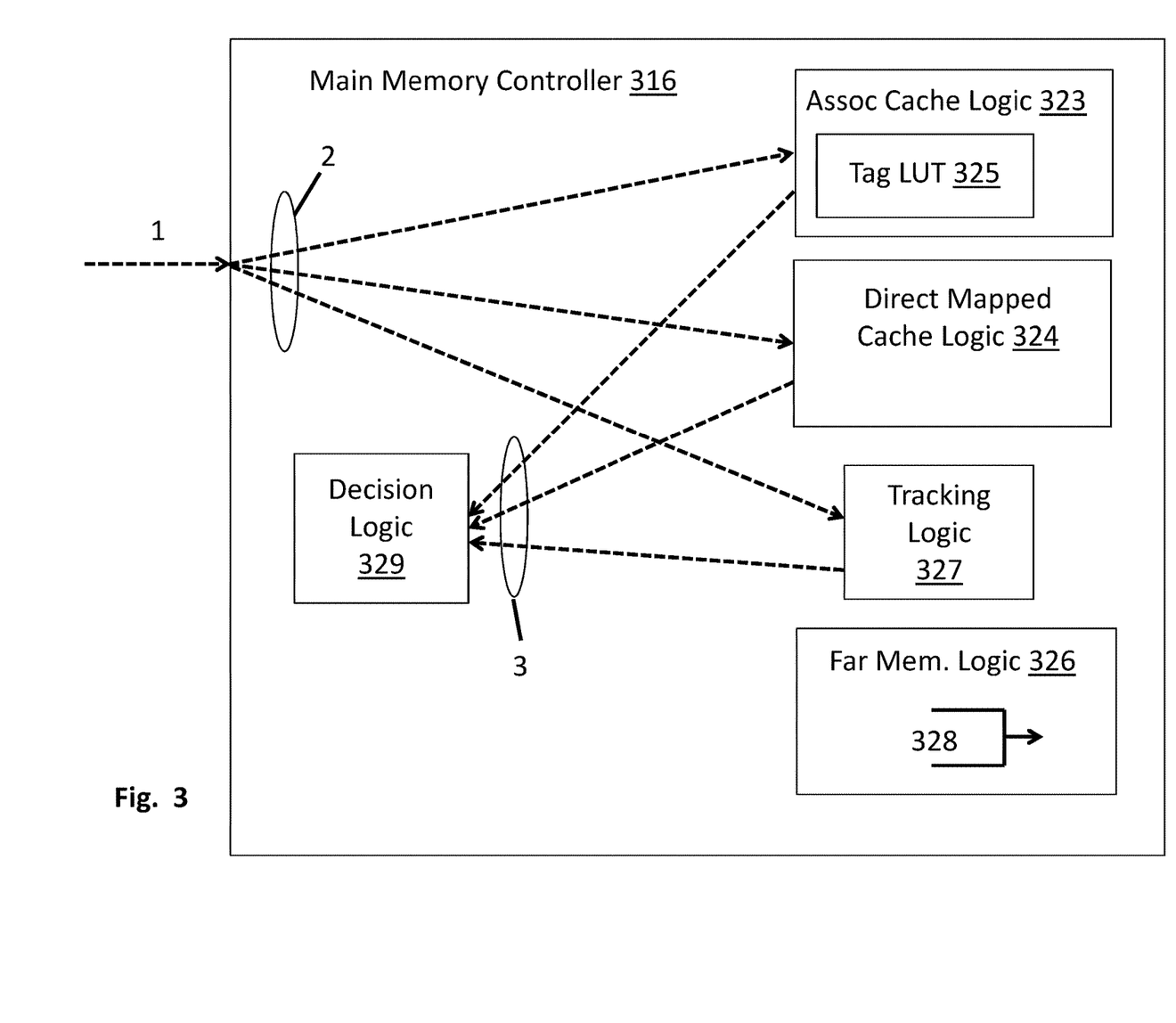
FIG. 3 shows a main memory controller designed to access near memory associative direct mapped caching structures and a far memory.

FIG. 3 diagrams a more efficient system memory read request handling process that performs the associative cache access and the direct map cache access within a same time frame (e.g., in parallel).

Here, as observed in FIG. 3, when a read request is received 1 by the memory controller, the memory controller proceeds to take three concurrent actions 2 in response: 1) the associative cache logic 323 performs a lookup into the associative cache (the associative cache logic looks for a tag match in the lookup table 325); 2) the direct mapped cache logic 324 performs a lookup into the direct map cache (a read is made into the direct mapped cache and the tag that is returned from the read is compared against the tag of the request's address); and, 3) tracking logic 327 checks to see if the requested cache line is in a transient state. Here, the concurrency of 1) and 2) above correspond to concurrent look-ups into the associative cache 321 and the direct mapped cache 322 which should reduce the observed latency of the direct mapped cache performance as discussed just above.

The action taken by memory controller decision logic 329 then depends on the results 3 of the inquiries 2 made into the associative cache, direct mapped cache and tracking logic blocks 323, 324, 327.

Here, if the associative cache logic 323 indicates a hit in the associative cache, the requested cache line is serviced from the associative cache and the cache line that was concurrently read from the direct mapped cache by the direct mapped cache logic 324 to perform the tag comparison is dropped.

In an embodiment, it is not possible for the look-up into table 325 to indicate a hit if the cache line is in a transient state to/from the associative cache because the look-up table 325 is on the same die as the tracking logic 327. That is, the tracking logic 327 and look-up table 325 are tightly synchronized so that a true hit or miss can be reported from the associative cache logic 323. For example if the desired cache line is in the process of being entered into the associative cache line or evicted from the associative cache, the tracking logic is able to provide the requested cache line as the read response and the associative cache logic 323 is able to report a hit. If the tracking logic 327 does not recognize the cache line as being in transit and the lookup into the table 325 reveals a miss, the miss reported by the associative cache logic 323 can be understood to be a true miss.

Here, if the associative cache logic 323 indicates a miss in the associative cache, the direct mapped cache logic 324 indicates a hit in the direct mapped cache and the tracking logic 327 does not indicate that the requested cache line is in a transient state, then the request is serviced from the direct mapped cache (the cache line that was read from the direct mapped cache to perform the tag comparison operation is used to service the read request).

Here, for reasons discussed more thoroughly below, because the tag information for the direct mapped cache is kept in the actual cache and not in the memory controller 316 logic circuitry, the tight synchronization that exists between the tracking logic 327 and the look-up table 325 that exists with respect to the associative cache tag look up does not exist with respect to the direct mapped cache tag comparison. As such, there can be a form of propagation delay between the state of the tag information that exists in the direct mapped cache and the accuracy of that information. A true hit from the direct mapped cache is therefore only confirmed if the direct mapped cache logic 324 reveals a hit and the tracking logic 327 does not indicate that the cache line is in a transient state.

Further still, if the associative cache logic 323 indicates a miss in the associative cache, the direct mapped cache logic 324 indicates a miss in the direct mapped cache and the tracking logic 327 does not indicate that the requested cache line is in a transient state, then the request is serviced by reading the requested cache line from far memory through the far memory logic 326.

As can be gleaned from the above, the decision logic 329 accepts input from the tracking logic 327 to confirm the result of the tag comparison performed by the direct mapped cache logic 324. As alluded to above, because the tag information for a cache line that is kept in the direct mapped cache is kept in the cache itself along with its corresponding cache line, the direct mapped cache is not able to keep its tag information up to date as quickly as the associative cache (because the associative cache has the memory controller side look up table 325).

Consider the case of a cache line that is cached in the direct mapped cache but for which a decision has just been made to evict that cache line from the direct mapped cache (e.g., because a most recent access to the cache line's slot resulted in a miss). From the moment that the cache line is deemed to be evicted (which can arise as soon as the cache line's last access resulted in a miss) until the moment the new replacement cache line and its tag are fully written over the evicted cache line in the direct mapped cache slot, the tag information that is contained in the slot can be technically inaccurate.

That is, the tag information for the evicted cache line, and not the replacement cache line, will be present in the slot in the direct mapped cache. The extent of the time in which such inaccurate tag information can remain in the direct mapped cache generally increases with increasing cache line size because it takes longer to fully evict a larger cache line and fully replace it with an equally large replacement cache line. Additionally, the direct mapped cache logic 324 may prioritize servicing reads over writes.

If in servicing a read request a read were to be made by the direct mapped cache logic 324 of a slot while that contains inaccurate tag information, the read result could be a "false hit". That is, the old tag information that is to be written over matched the tag information of the read request. Meanwhile the latest up-to-date copy of the evicted cache line is elsewhere in the system and possibly even already updated with new write information (e.g., sitting in far memory write queue 328 or in far memory).

As such, in an embodiment, if the direct mapped cache logic 327 indicates a direct mapped cache hit but the tracking logic 327 indicates that the requested cache line is in a transient state, the read request is not serviced by the content that was just read by the direct mapped cache logic 324. In this case, the correct requested cache line is serviced from some other source.

For example, if the tracking logic 327 indicates that the requested cache line is in the process of being evicted from the direct mapped cache, the requested cache line may be found along the data path from the direct mapped cache logic 324 up through the far memory access logic 326 (e.g., within the far memory inbound write queue 328). In an embodiment, the tracking logic 327 "clears" its tracking of a cache line that has been evicted from the direct mapped cache once the cache line is completely written over with its replacement cache line in the direct mapped cache and has been committed to far memory. After this point, the cache line is no longer technically in transit and a false hit is no longer possible because the tag of the evicted cache line is no longer in the direct mapped cache.

In the opposite situation, where the direct mapped cache logic 324 reports a miss in the direct mapped cache and the tracking logic 327 indicates that the requested cache line is in the process of being inserted into the direct mapped cache, the requested cache line can be provided from a data path that feeds into the direct mapped cache such as a data path from the associative cache to the direct mapped cache. As such, in an embodiment, if the decision logic 329 receives a miss from the associative cache logic 323, a miss from the direct mapped cache logic 324 but the tracking logic 327 indicates that the cache line is to be inserted into the direct mapped cache, the decision logic 329 chooses to obtain the requested read line from such a data path rather than from far memory.

In an embodiment, once the correct requested cache line has been retrieved its cache coherency state information is checked (e.g., by state checking logic not depicted in FIG. 3 for illustrative convenience). For example, in various embodiments a cache line has associated meta data that indicates whether the cache line is in a Modified, Exclusive, Shared or Invalid state consistent with the MESI cache coherency protocol. If, for instance, the cache line is in the Modified state, the main memory controller 316 may choose to write back a copy of the cache to far memory 314. Here, consistent with the purpose of the MESI cache coherency protocol, in preceding discussions where an evicted cache line was "written back" to a lower cache or far memory, such writing back only happens for cache lines in the Modified state.

In a further embodiment, the memory controller 316 of FIG. 3 is designed to process "super-lines" rather than normal cache lines. Here, as just one example, a CPU processing core may be designed to locally cache 64 bytes of data as a single cache line. However, e.g., by the time cache lines are entered into a last level cache that architecturally is just above the memory controller 316 (an eviction from the last level cache causes the evicted line to be sent to the memory controller 316), such 64 byte cache lines are packed into a larger super-line that includes, four, eight, sixteen or sixty-four 64 byte cache lines (the super line is therefore 256 bytes, 512 bytes, 1024 bytes or 4096 bytes). As such, the cache lines discussed above with respect to FIGS. 2 and 3 are super-lines as opposed to smaller traditional cache lines.

Here, operation is as discussed above except that the super-line itself may include meta data that labels the super-line as a whole as being in one of the MESI states. Additionally, the meta data may further include respective MESI states for each of the respective constituent cache lines that have been packed into the super-line. Thus, the state checking that occurs once the correct cache line has been retrieved includes state checking not only of the super-lines MESI state but also the respective MESI states of its individual traditional cache lines. Note that in the case of super-lines, the aforementioned cache coherency problem (a false hit in the direct mapped cache because incorrect tag information remains resident in the direct mapped cache) is more likely to occur without the algorithm discussed just above.

In a further embodiment, the decision logic 329 sends a "confirm" or "unconfirm" message to the memory controller's read request handling logic (not shown in FIG. 3) and/or direct mapped cache logic 324 that indicates whether or not the read result from the direct mapped cache read operation should be used to service the read request.

Specifically, an "unconfirm" message, meaning the read information from the direct mapped cache is not used, is sent if: 1) the associative cache logic 323 indicates a hit (cache line serviced from associative cache); 2) both the associative cache logic 323 and the direct mapped cache logic 324 indicate a miss and the tracking logic 327 indicates that the cache line is not in transit (cache line serviced from far memory); or 3) the tracking logic indicates the requested cache line is being evicted from or inserted into the direct mapped cache (cache line serviced from a data path to/from direct mapped cache or the destination of the in transit cache line).

By contrast, a "confirm" message, meaning the read information from the direct mapped cache is used to service the read request, is sent if the associative cache logic indicates a miss, the direct mapped cache indicates a hit and the tracking logic does not indicate that the cache line is in transit.

In a further embodiment, the memory controller's read request logic assigns a unique ID to each incoming read request and one or more of the inquiries 2 and corresponding responses 3 of FIG. 3 are appended with the unique ID so that the decision logic 329 can understand not only which responses 3 correspond to which in flight read request but also identify which decision result applies to which in flight read request by appending the unique ID to the confirm/unconfirm message. With the confirm/unconfirm message appended with the unique ID, the memory controller's read handling request logic (and/or direct mapped cache logic) will know which of its plurality of in flight read requests are to be serviced from the direct mapped cache and which read requests are not to be serviced from the direct mapped cache.

In some embodiments decision logic 329 resides outside the memory controller and is placed in between the memory controller and the requesting entities (e.g., between the memory controller and processing cores).

Figure 4:
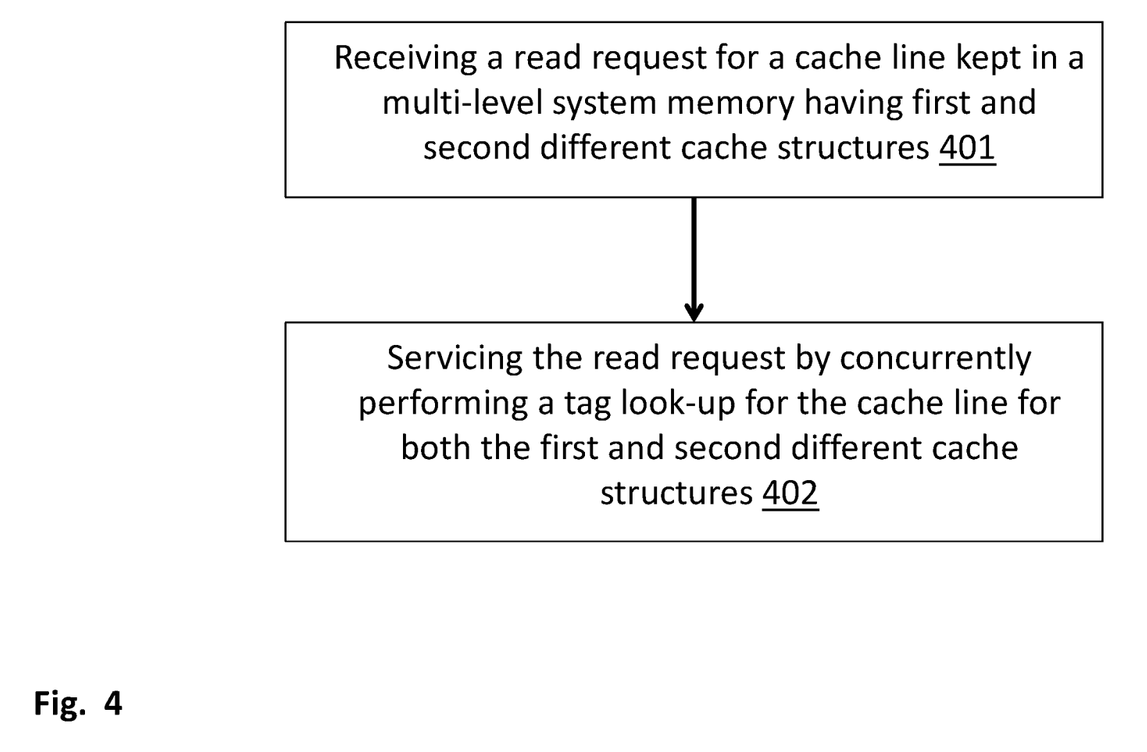
FIG. 4 shows a method performed by the memory controller of FIG. 3.

FIG. 4 shows a method described above. The method includes receiving 401 a read request for a cache line kept in a multi-level system memory having first and second different cache structures. The method also includes servicing 402 the read request by concurrently performing a tag look-up for the cache line for both the first and second different cache structures.

Figure 5:
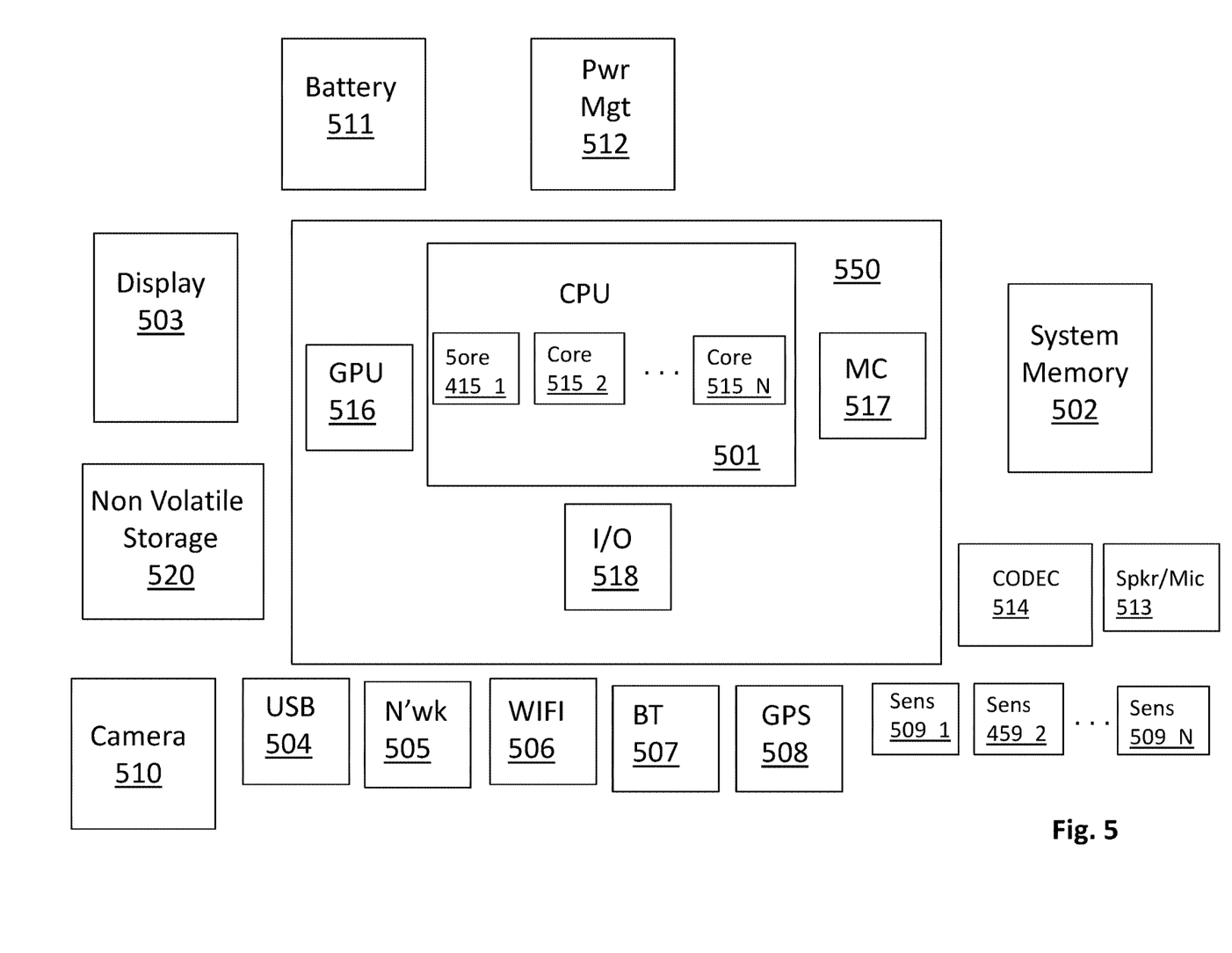
FIG. 5 shows a computing system.

FIG. 5 shows a depiction of an exemplary computing system 500 such as a personal computing system (e.g., desktop or laptop) or a mobile or handheld computing system such as a tablet device or smartphone, or, a larger computing system such as a server computing system. As observed in FIG. 5, the basic computing system may include a central processing unit 501 (which may include, e.g., a plurality of general purpose processing cores and a main memory controller disposed on an applications processor or multi-core processor), system memory 502, a display 503 (e.g., touchscreen, flat-panel), a local wired point-to-point link (e.g., USB) interface 504, various network I/O functions 505 (such as an Ethernet interface and/or cellular modem subsystem), a wireless local area network (e.g., WiFi) interface 506, a wireless point-to-point link (e.g., Bluetooth) interface 507 and a Global Positioning System interface 508, various sensors 509_1 through 509_N (e.g., one or more of a gyroscope, an accelerometer, a magnetometer, a temperature sensor, a pressure sensor, a humidity sensor, etc.), a camera 510, a battery 511, a power management control unit 512, a speaker and microphone 513 and an audio coder/decoder 514.

An applications processor or multi-core processor 550 may include one or more general purpose processing cores 515 within its CPU 501, one or more graphical processing units 516, a memory management function 517 (e.g., a memory controller) and an I/O control function 518. The general purpose processing cores 515 typically execute the operating system and application software of the computing system. The graphics processing units 516 typically execute graphics intensive functions to, e.g., generate graphics information that is presented on the display 503. The memory control function 517 interfaces with the system memory 502. The system memory 502 may be a multi-level system memory having different caching structures in a faster level of system memory. The memory function 517 may be designed to concurrently perform look-ups into the different caching structures as described above.

Each of the touchscreen display 503, the communication interfaces 504-507, the GPS interface 508, the sensors 509, the camera 510, and the speaker/microphone codec 513, 514 all can be viewed as various forms of I/O (input and/or output) relative to the overall computing system including, where appropriate, an integrated peripheral device as well (e.g., the camera 510). Depending on implementation, various ones of these I/O components may be integrated on the applications processor/multi-core processor 550 or may be located off the die or outside the package of the applications processor/multi-core processor 550. The mass storage of the computing system may be implemented with non volatile storage 520 which may be coupled to the I/O controller 518 (which may also be referred to as a peripheral control hub).

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), programmable logic arrays (PLAs), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

An apparatus has been described above that includes a memory controller to interface to a multi-level system memory having first and second different cache structures. The memory controller has circuitry to service a read request by concurrently performing a look-up into the first and second different cache structures for a cache line that is targeted by the read request.

In at least one embodiment of the apparatus, the first cache structure is an associative cache and the second cache structure is a direct mapped cache. In a further embodiment, tag information for the associative cache is kept on the memory controller and tag information for the direct mapped cache is kept in the direct mapped cache.

In at least one embodiment of the apparatus the tag information for the first cache is kept on the memory controller and tag information for the second cache is kept in the second cache.

In an at least one embodiment of the apparatus the memory controller comprises tracking logic circuitry that identifies cache lines that will imminently be inserted into or evicted from at least one of the first or second cache structures. The circuitry is to receive information from the tracking logic circuitry. In a further embodiment the information is used by the circuitry to recognize that a tag match for the cache line in one of the caches is not valid if the information indicates that the cache line is being evicted from the one cache. In a further embodiment the one cache keeps its tag information within the one cache.

In at least one embodiment of the apparatus the circuitry is designed to provide the cache line if the cache line has: a) a matching tag found in one of the caches; b) no matching tag in the other of said caches.

A computing system has been described that includes the apparatus described just above.

A method is described that includes receiving a read request for a cache line kept in a multi-level system memory having first and second different cache structures. The method also includes servicing the read request by concurrently performing a tag look-up for the cache line for both the first and second different cache structures.

In at least one embodiment of the method, the first cache structure is an associative cache and the second cache structure is a direct mapped cache. In a further embodiment tag information for the associative cache is kept on the memory controller and tag information for the direct mapped cache is kept in the direct mapped cache. In a further embodiment the method further includes recognizing that a tag match for the cache line in the direct mapped cache is not valid because tracking logic indicates that the cache line is being evicted from the direct mapped cache.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a memory controller to interface to a multi-level system memory having a first cache structure and a second cache structure, said first cache structure being a first memory side cache, said second cache structure being a second memory-side cache, said memory controller having request service circuitry to service a read request by concurrently performing a look-up into said first and second cache structures for a cache line that is targeted by said read request, wherein first tag information for said first cache structure is kept on said memory controller and second tag information for said second cache structure is kept in said second cache structure, wherein, said memory controller comprises tracking logic circuitry to identify cache lines that will imminently be inserted into at least one of said first cache structure and said second cache structure.

2. The apparatus of claim 1 wherein said first cache structure is an associative cache and said second cache structure is a direct mapped cache.

3. The apparatus of claim 2 wherein said second tag information is kept in said direct mapped cache.

4. The apparatus of claim 1 wherein said tracking logic circuitry is also to identify cache lines that will imminently be evicted from the at least one of said first cache structure and said second cache structure, said request service circuitry to receive tracking information from said tracking logic circuitry.

5. The apparatus of claim 4 wherein said first tag information and said second tag information are used by said request service circuitry to recognize that a tag match for said cache line in one of said first cache structure and second cache structure is not valid if said tracking information indicates that said cache line is being evicted from said one of said first cache structure and said second cache structure.

6. The apparatus of claim 5 wherein said first cache structure is to keep said first tag information and said second cache structure is to keep said second tag information.

7. The apparatus of claim 1 wherein said request service circuitry is designed to provide said cache line if said cache line has:
a) a matching tag found in one of said first cache structure and said second cache structure; and,
b) no matching tag found in the other of said first cache structure and said second cache structure.

8. A computing system, comprising:
one or more processing cores;
a multi-level system memory;
a memory controller to interface to said multi-level system memory having a first cache structure and a second cache structure, said first cache structure being a first memory side cache, said second cache structure being a second memory-side cache, said memory controller having request service circuitry to service a read request by concurrently performing a look-up into said first and second cache structures for a cache line that is targeted by said read request, wherein first tag information for said first cache structure is kept on said memory controller and second tag information for said second cache structure is kept in said second cache structure, wherein, said memory controller comprises tracking logic circuitry to identify cache lines that will imminently be inserted into at least one of said first cache structure and said second cache structure; and,
a network interface.

9. The computing system of claim 8 wherein said first cache structure is an associative cache and said second cache structure is a direct mapped cache.

10. The computing system of claim 9 said second tag information is kept in said direct mapped cache.

11. The computing system of claim 8 wherein said tracking logic circuitry is also to identify cache lines that will imminently be evicted from the at least one of said first cache structure and said second cache structure, said request service circuitry to receive tracking information from said tracking logic circuitry.

12. The computing system of claim 11 wherein said first tag information and said second tag information are used by said request service circuitry to recognize that a tag match for said cache line in one of said first cache structure and second cache structure is not valid if said tracking information indicates that said cache line is being evicted from said one of said first cache structure and said second cache structure.

13. The computing system of claim 12 said first cache structure is to keep said first tag information and said second cache structure is to keep said second tag information.

14. The computing system of claim 8 wherein said request service circuitry is designed to provide said cache line if said cache line has:
a) a matching tag found in one of said first cache structure and said second cache structure; and,
b) no matching tag found in the other of said first cache structure and said second cache structure.

15. A method, comprising:
receiving a read request for a cache line kept in a multi-level system memory having a first cache structure and a second cache structure, said first cache structure being a first memory side cache, said second cache structure being a second memory-side cache;
servicing said read request by performing a), b) and c) below:
a) performing a first tag look-up for said cache line for one of said first cache structure and said second cache structure, said performing of said first tag look-up comprising accessing a tag array that is separate from said one of said first cache structure and said second cache structure;
b) performing a second tag look-up for said cache line for the other one of said first cache structure and said second cache structure, said performing of said second tag look-up comprising accessing the other one of said first cache structure and said second cache structure; and c) identifying cache lines that will imminently be inserted into at least one of said first cache structure and said second cache structure and determining a particular read request service flow based on said identifying of said cache lines, said first tag look-up and said second tag look-up.

16. The method of claim 15 wherein said first cache structure is an associative cache and said second cache structure is a direct mapped cache.

17. The method of claim 16 wherein first tag information for said associative cache is kept on said memory controller and second tag information for said direct mapped cache is kept in said direct mapped cache.

18. The method of claim 16 further comprising recognizing that a tag match for said cache line in said direct mapped cache is not valid because tracking logic indicates that said cache line is being evicted from said direct mapped cache.

* * * * *